(12) United States Patent
Kojima et al.

(10) Patent No.: US 6,745,109 B2
(45) Date of Patent: Jun. 1, 2004

(54) POWER GENERATOR CONTROLLER

(75) Inventors: Yasuhiro Kojima, Tokyo (JP); Shizuka Nakamura, Tokyo (JP); Kazumi Mori, Tokyo (JP); Yoshio Izui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/365,694

(22) Filed: Feb. 13, 2003

(65) Prior Publication Data

US 2004/0039490 A1 Feb. 26, 2004

(30) Foreign Application Priority Data

Aug. 23, 2002 (JP) ........................................ 2002-243612

(51) Int. Cl.[7] .............................................. G05D 11/00
(52) U.S. Cl. ........................ 700/291; 700/28; 700/286; 705/412
(58) Field of Search ................................ 700/287, 286, 700/291, 28, 29, 33; 705/412

(56) References Cited

U.S. PATENT DOCUMENTS

| 5,301,256 | A |   | 4/1994  | Nakamura              |
|-----------|---|---|---------|-----------------------|
| 5,432,710 | A | * | 7/1995  | Ishimaru et al. ........ 705/412 |
| 5,467,265 | A | * | 11/1995 | Yamada et al. .......... 700/291 |
| 5,798,939 | A | * | 8/1998  | Ochoa et al. ............ 700/286 |
| 6,021,402 | A | * | 2/2000  | Takriti ................... 700/291 |

FOREIGN PATENT DOCUMENTS

JP          2001-37087          2/2001

OTHER PUBLICATIONS

Harold Chestnut, Ststems Engineering Tools, 1965, John Wiley &Sons, pp. 462–467.*

* cited by examiner

*Primary Examiner*—Albert W. Paladini
(74) *Attorney, Agent, or Firm*—Leydig, Voit & Mayer, Ltd.

(57) ABSTRACT

A power generator controller includes a power system monitor and a power generator output optimizing part. The power system monitor keeps check on current status of a power system and puts out an electricity demand. The power generator output optimizing part solves an objective function for determining outputs of power generators of the power system at an interval under a supply and demand balancing constraint which imposes agreement between electric power demanded and electric power supplied. The objective function minimizes total costs in power generation. The power generator output optimizing part solves the objective function further considering an automatic frequency control capacity constraint based on an upper limit of rates of change of outputs of power generators of the power system.

15 Claims, 15 Drawing Sheets

FIG.3

OBJECTIVE FUNCTION $$\min \sum_{G,T} \left( a_g P_{gt}^2 + b_g P_{gt} + c_g \right) \times U_{gt}$$

$P_{gt}$ : Output of power generator $g$ at time $t$ $a_g, b_g, c_g$ : Fuel cost factors of power generator $g$ $U_{gt}$ : Operational status of power generator $g$
 (0: Closed, 1: Operated)

G : Subscript standing for the whole of power generators

T : Subscript standing for the whole time of the schedule

FIG.4

SUPPLY AND DEMAND BALANCING CONSTRAINT $$L_t = \sum_G P_{gt}$$

$L_t$ : Predicted total demand at time $t$
 ( Share in capacity of power generators under control)

FIG.5

UPPER AND LOWER LIMITS CONSTRAINT FOR POWER GENERATORS $$P\max_{gt} > P_{gt} > P\min_{gt}$$

$P\max_{gt}, P\min_{gt}$ : Upper and lower limits of outputs at time $t$ for power generator $g$

FIG.6

CHANGING SPEED CONSTRAINT $$Y\max_{gt} > P_{gt} - P_{g,t-1} > -Y\max_{gt}$$

$Y\max_{gt}$ : Upper limit of changing speed at time $t$ for power generator $g$

FIG.7

POWER FLOW CONSTRAINT $$F\max_{l,t} > F0_{lt} + \sum_{G} k_{l,g} P_{gt} > -F\max_{l,t}$$

$F\max_{l,t}$ : Upper limit of power flow at time $t$ for line $l$ $F0_{lt}$ : Power flow at time $t$ for line $l$ in a case where the total output of power generators on line $l$ is zero $k_{l,g}$ : Power flow sensitivity of line $l$ at time $t$ for power generator $g$

FIG.8

FUEL CONSUMPTION CONSTRAINT $$Total_D = \sum_{D,T} P_{gt}$$

$D$ : Subscript standing for power generators that belong to fuel consumption constraint group D $Total_D$ : Target fuel consumption of fuel consumption constraint group D

FIG.9

AFC CAPACITY CONSTRAINT $$x_{gt} < P\max_{gt} - P_{gt}$$
$$x_{gt} < Y\max_{gt} \times T_{afc}$$
$$AFC_t < \sum_G x_{gt}$$

$x_{gt}$ : AFC capacity secured by power generator $g$ at time $t$ $T_{afc}$ : Time for calculating AFC capacity $AFC_t$ : Upper bound of AFC capacity at time $t$

FIG.15

VARIABLE SPEED FLYWHEEL CAPACITY CONSTRAINT $$F\max - r_t > AFC_f$$
$$r_t = F_{st} - \alpha(L_t - L_{t-1})$$

$F\max$ : Maximum controllable output of variable speed flywheel $AFC_f$ : Variable speed flywheel's share in AFC capacity $r_t$ : Predicted AFC capacity of variable speed flywheel at time $t$ $\alpha$ : Control sensitivity factor of variable sped flywheel $F_{st}$ : Set value of variable speed flywheel (control variable)

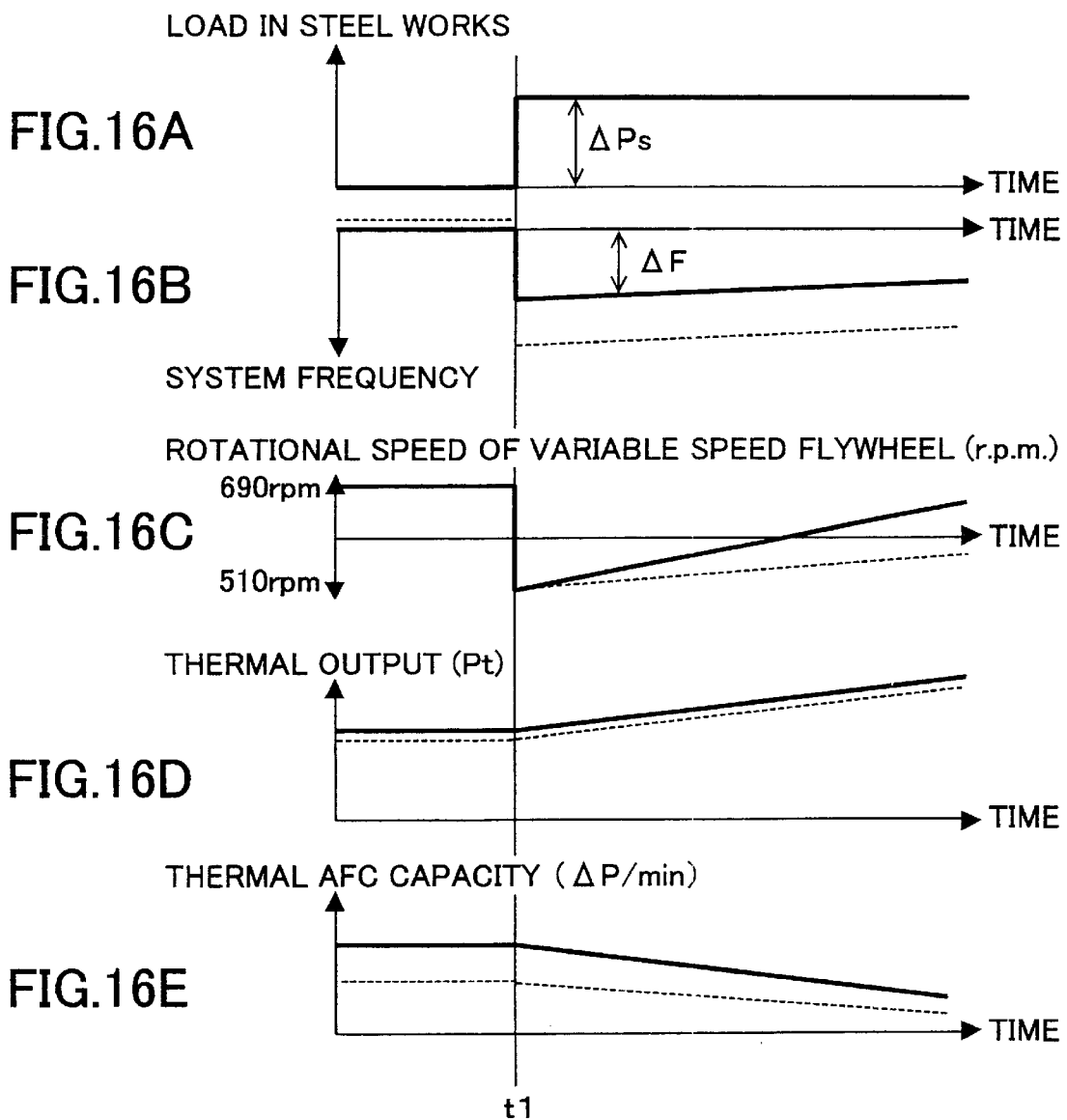

FIG.17

FREQUENCY DEVIATION CONSTRAINT $$\max_{t_j} \Delta F[t_j] < \Delta F \max$$

$$-\Delta F \min < \min_{t_j} \Delta F[t_j]$$

$\Delta F \min$ : Allowable minimum of frequency deviation $\Delta F \max$ : Allowable maximum of frequency deviation The frequency deviation $\Delta F[t_j]$ at time $t_j$ is given by the following equation.

$$\Delta F[t_j] = \frac{\left(\sum_i P_i[t_j] - Demand[t_j]\right)}{K}$$

K : System constant

Demand[tj] : Demand on electricity at time $t_j$

Pi[tj] : Output of power generator i in conjunction with following delays at time $t_j$ and changing speeds

POWER GENERATOR CONTROLLER

BACKGROUND OF THE INVENTION

1. Field of the Invention

The present invention relates to a power generator controller and, more particularly, to a power generator controller for instructing each of power generators in remote places on adjustment of its electric power output.

2. Description of the Related Art

Electric power plants include hydroelectric power plants, thermal power plants, nuclear power plants and the like. These power plants generate electricity and deliver it to consumers through power transmission lines. Outputs of electric power generated in those power plants need to be adjusted separately according to the electricity consumed, because electricity cannot be stored. It is a central load-dispatching office that directs power plants to control outputs of electricity separately, while closely monitoring the power consumption which varies every second. Through a supply and demand balancing constraint, the central load-dispatching office gives instructions to increase or decrease the supply of electricity in accordance with the electricity needs and controls the outputs of power or turbine generators so as to make electricity demanded in full agreement with outputs supplied.

The central load-dispatching office gives instructions to the power plants separately, considering a variety of constraints other than the supply and demand balancing constraint. For example, a nuclear power plant can operate continuously for one year and more once fueled, but can not make a prompt change in output of electric power easily. On the contrary, a thermal power plant can increase or decrease the output of electric power with relative ease according to the electric power consumed. The range of speed in which a power generator can adjust the output of electric power with ease is called a changing speed constraint.

An appropriate range is set on outputs of electricity to ensure that a power generator may operate reliably for a long time. The range in which power generators can supply electric power steadily is called an upper and lower limit constraint for power generators. Some power generators accept output instructions of discrete variables, but not of continuous values. In addition, there is a case where outputs of a power generator are divided into a plurality of bands. Some power generators accept a step transfer constraint of power generators in which they can change their outputs continuously within the range of a band, but a predetermined time is necessary for allowing a transfer in their outputs from one band to another band.

Thermal power plants use fuels such as petroleum, liquefied natural gas (LNG), and coal for generation of electricity. These fuels have limitations in the amounts to be supplied, and the power plants are not allowed to raise their outputs of electricity beyond the amount of fuels supplied. This is called a fuel consumption constraint.

Generated electricity is delivered through power transmission lines and potential transformers. Power transmission networks are formed by lines including the power transmission lines and the potential transformers so as to deliver electric power most efficiently in response to demand of electricity and to promptly respond to troubles on a route by delivering electricity through another route. However, each line has an upper limit on transmission of electricity, and is not allowed to supply electric power beyond the upper limit. It is called a power flow constraint that power generators control their outputs of electricity so that each line does not transmit electricity beyond its own upper limit.

When a power plant increases its output of electric power by one unit, the amount of electricity carried through a certain line increases. The increase is called a power flow sensitivity and varies every second according to the actual status of a power system.

The central load-dispatching office also considers cost savings in the generation of electricity. To optimize the cost of power generation based on the predicted demand for total electric power is called EDC (Economic Dispatching Control). This is usually performed every three to five minutes. Likewise, a similar controlling method known as AFC (Automatic Frequency Control) is performed. System frequencies tend to deviate from the rating of the power system by their nature when supply and demand for electricity are out of balance. Therefore, AFC is carried out to adjust outputs of power generators every five seconds, for example, based on the frequency deviation.

Taking into account such various constraints, the central load-dispatching office gives instructions for each of the power plants to adjust its output of electric power continuously. Japanese Patent Laid Open 2001-037087 discloses a method for determining the outputs of power generators at multiple time sections so as to satisfy the supply and demand balancing constraint, the upper and lower limits constraint for power generators, the power flow constraint, and the fuel consumption constraint.

When the power flow constraint needs to be considered at a regular interval, the central load-dispatching office finds solutions by adding an equation relating the power flow constraint to the supply and demand balancing constraint, where the central load-dispatching office uses a given power flow sensitivity of the lines at every moment. As for the fuel consumption constraint, the central load-dispatching office calculates fuel consumption from the outputs of power generators determined by the method described above. If the calculated fuel consumption does not match a target fuel consumption, the central load-dispatching office then finds solutions by changing correction factors for fuel costs and redetermines the outputs of the power generators.

In order to carry out maintenance work for power transmission lines and potential transformers on schedule, plans for the line maintenance work are prepared. Though maintenance work is conducted according to the plans, if the maintenance work of a day goes ahead of or falls behind the schedule, lines shutdown and periods of shutdown might be changed. In addition, an accident might completely stop the power transmission for a great while. In other words, the power flow sensitivity of each line varies continually according to the actual system status and the progress of the planned schedule for line work of a day. Then, the power flow constraint that uses a power flow sensitivity given beforehand does not always reflect the power system status correctly. Consequently, there might arise a problem that outputs of power generators are not as accurately adjusted as required.

As for the fuel consumption constraint, there is a problem that processing procedures for finding solutions takes quite a time, because a procedure is iterated in which a fuel consumption is calculated after an output of a generator is determined and then the output of the generator is determined again by adjusting a correction factor of the fuel cost to make a good coincidence with the target fuel consumption.

The central load-dispatching office predicts demand for electricity beforehand to control the outputs of power generators. When the actual demand shifts from the prediction, some power generators might lose control for following the shift because they have a limit in speed to increase or decrease their outputs. Discrepancies between the actual total demand of the day and the predicted total demand might arouse problems that the supply and demand balancing constraint is not satisfied, or the power system frequency is deviated.

In addition, since the deviation in the power system frequency is not handled directly, EDC can not keep the power system frequency in coincidence with the rating, particularly when power generators, such as pumped-storage power plants, are put on or taken off the power system.

SUMMARY OF THE INVENTION

It is an object of the present invention to provides a power generator controller which can accurately adjust the outputs of power generators and suppress variations in the power system frequency, where power generation costs are optimized based on predictions of the demand for total electric power.

A power generator controller in the invention includes a power system monitor and a power generator output optimizing part. The power system monitor keeps check on the current status of the power system and puts out demands on electricity. The power generator output optimizing part solves an objective function for determining outputs of power generators at a predetermined interval under a supply and demand balancing constraint which imposes the agreement between electric power supplied and electric power demanded. The objective function requires the minimal total costs in power generation for a plurality of power generators. Herein, the power generator output optimizing part solves the objective function further in consideration of an AFC capacity constraint that is determined based on an upper limit of changing speed of power generators.

A power generator controller in another aspect of the invention includes a power system monitor, a line work scheduler, a power system section drawing unit, a power flow sensitivity calculating unit, a power generator output optimizing part. The power system monitor keeps check on the switching conditions of lines connected to a power system and puts out the status of a current system. The line work scheduler puts out schedules on line maintenance works. The power system section drawing unit draws a future status of the power system by using the current system status and the line work schedules. The power flow sensitivity calculating unit calculates a power flow sensitivity of the lines at every section of the power system. The power generator output optimizing part solves the objective function incorporating a power flow constraint, and determines outputs of the power generators at a predetermined interval, where the power generator output optimizing part uses a power flow sensitivity calculated by the power flow calculating unit for considering the power flow constraint.

BRIEF DESCRIPTION OF THE DRAWINGS

The teachings of the invention can be readily understood by considering the following detailed description in conjunction with the accompanying drawings, in which:

FIG. 3 is a diagram illustrating an objective function used for EDC control;

FIG. 4 is a diagram for illustrating a supply and demand balancing constraint;

FIG. 5 is a diagram illustrating an upper and lower limits constraint for power generators;

FIG. 6 is a diagram illustrating a changing speed constraint;

FIG. 7 is a diagram illustrating a power flow constraint;

FIG. 8 is a diagram for illustrating a fuel consumption constraint;

FIG. 9 is a diagram illustrating an AFC capacity constraint;

FIG. 15 is a diagram illustrating a variable speed flywheel constraint;

FIGS. 16A to 16E are diagrams illustrating effects of cooperative control;

FIG. 17 is a diagram for illustrating a frequency deviation constraint;

DESCRIPTION OF THE PREFERRED EMBODIMENT

Embodiment 1

Figure 1:
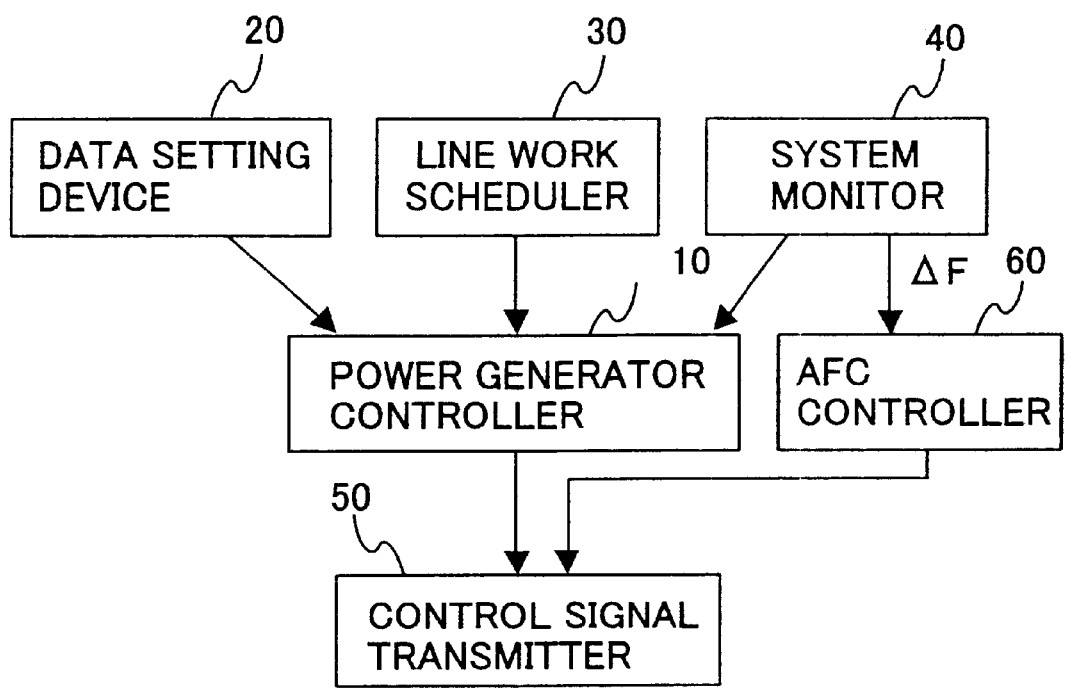
FIG. 1 is a block diagram illustrating a configuration of a central load-dispatching office.

FIG. 1 shows an exemplary configuration of a central load-dispatching office, which includes a power generator controller 10, a data setting device 20, a line work scheduler 30, a power system monitor 40, a control signal transmitter 50, and an AFC controller 60. The power generator controller 10 generates instruction signals for performing EDC control every five minutes or so, in order to optimize costs of power generation. The AFC controller 60 puts outs instruction signals for performing AFC control every five seconds, for instance, based on the frequency deviation ΔF of a power system detected by the power system monitor 40.

Outputs of the power generator controller 10 and the AFC controller 60 are transmitted to power generators (not shown) separately as output commands by the control signal transmitter 50, and the separate power generators are operated based on the commands. The invention substantially relates to EDC control, and thus the AFC controller 60 will not be described in detail.

Figure 2:
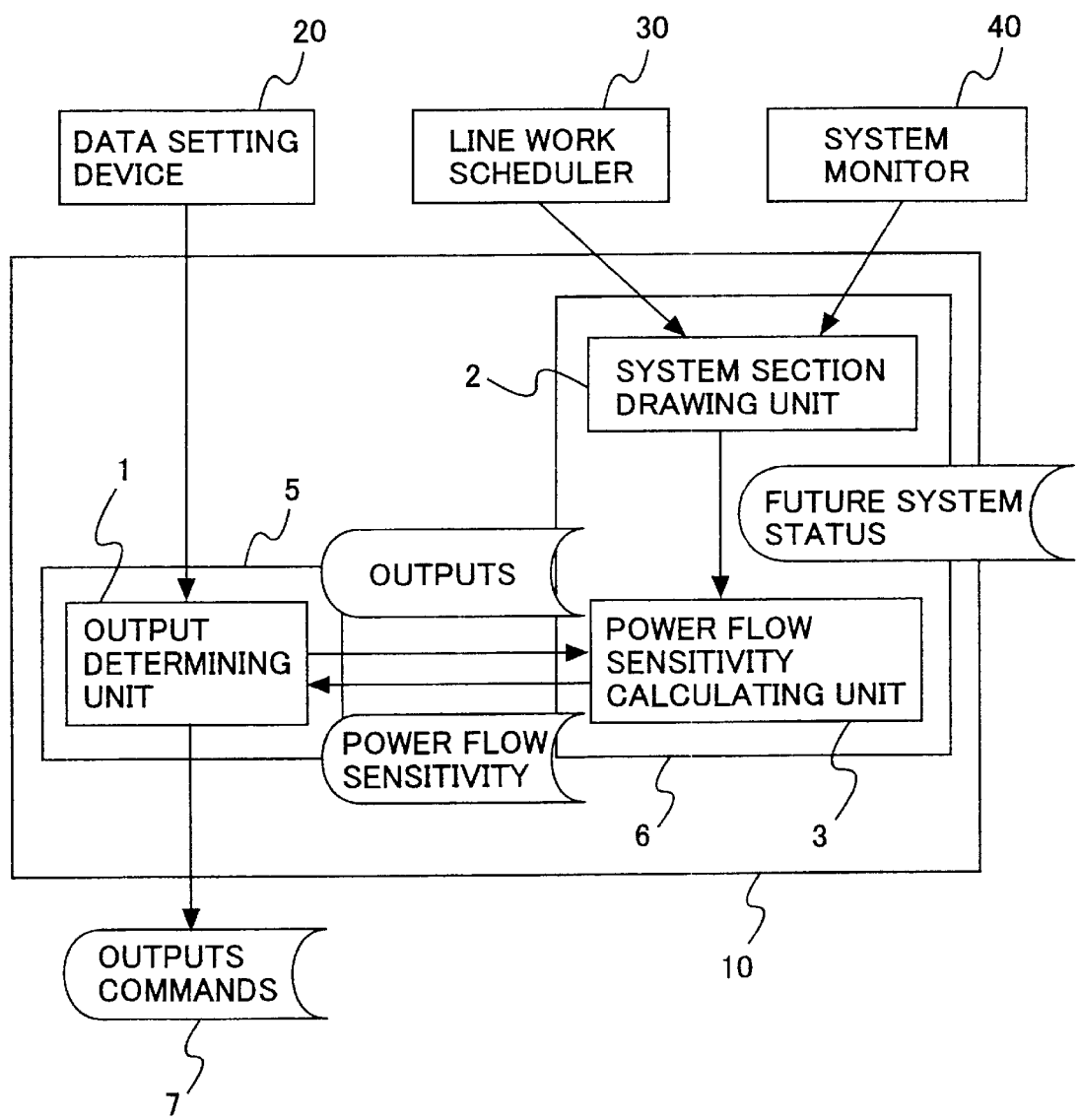
FIG. 2 is a block diagram illustrating a configuration of an output determining unit.

FIG. 2 is a block diagram illustrating the configuration of the power generator controller 10, which includes a power generator output optimizing part 5 and a power system calculating part 6. The power generator output optimizing part 5 consists of a computer for solving optimization problems and includes an output determining unit 1. The power system calculating part 6 includes a power system section drawing unit 2 and a power flow sensitivity calculating unit 3.

The power generator output optimizing part 5 obtains predicted values of total demand on electricity, details of power generator's fuel cost and data on upper and lower limits constraint for power generators, changing speed constraint for power generator's output, fuel consumption constraint, power flow constraint for each line, AFC capacity constraint, etc. through the data setting device 20. The power system calculating part 6 obtains scheduling data on line works from the line work scheduler 30 and further obtains a current system status and accident information of the facilities from the power system monitor 40.

An output of power generator 7 is determined by using optimization models to solve an objective function and various constraints formulated in FIGS. 3 to 9. These constraints can be removed properly according to the accuracy required. The objective function shown in FIG. 3 is an equation in which the sum of costs for power generation is minimized through the predetermined whole time (T) and the cost of power generation in a power generator G is described approximately with a quadratic function of an output Pgt.

FIGS. 4 to 6 are formulated constraint equations for the supply and demand balancing constraint, the upper and lower limits constraint for power generators, and the changing speed constraint, which are described qualitatively before. The power flow constraint shown in FIG. 7 is a formula in which each line has a power flow sensitivity (klg) of its own. As will be described later, the power flow sensitivity is calculated at every section of the future system. In addition, the power flow of a line L is defined as F0 when the whole of power generators under control are set to zero in output.

As for the fuel consumption constraint shown in FIG. 8, Group D is an assemblage of power generators that need to consider the fuel consumption as a thermal power plant does. The fuel consumption constraint expresses the necessity to equalize the sum of the outputs Pgts of power generators belonging to the Group D with a target fuel consumption (Total D). Because the fuel consumption constraint is incorporated as a constraining relationship for solving the objective function, fuel costs are calculated without repeating calculations of correction factors on fuel costs and, then, outputs of power generators can be determined in only one processing in calculation.

Figure 10:
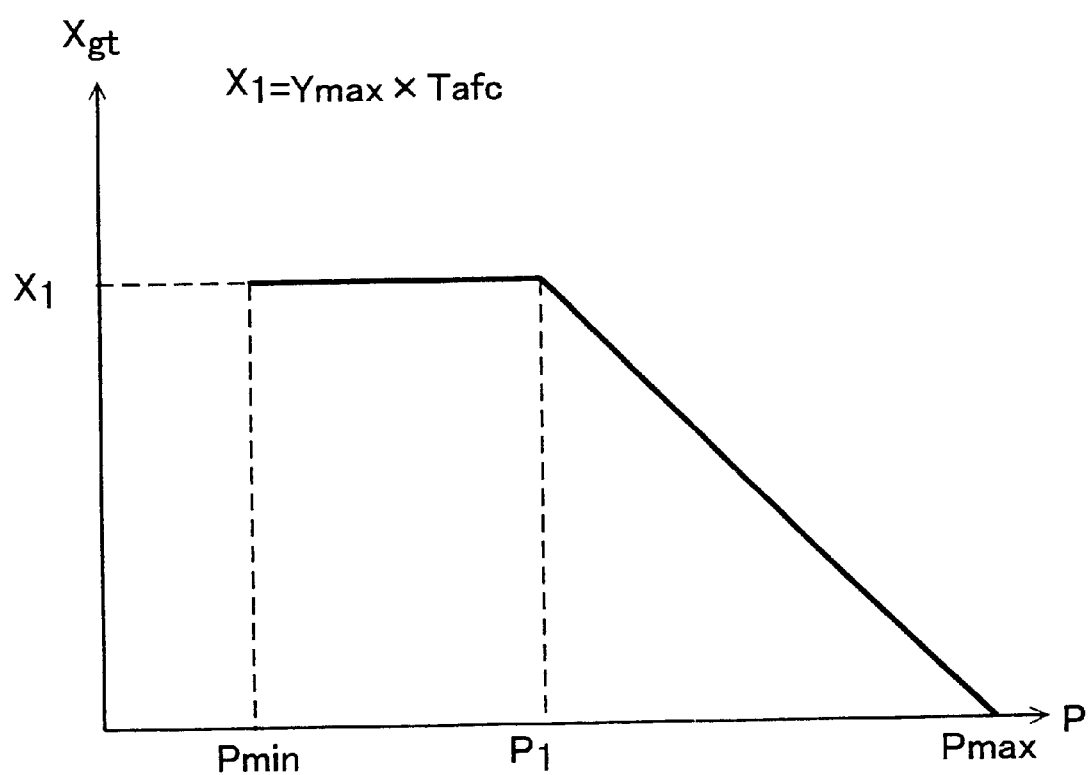
FIG. 10 is a diagram illustrating a relationship between the AFC capacity and the output of a power generator.

The AFC capacity constraint shown in FIG. 9 assure the AFC capacity for separate power generators based on Ymax, an upper bound of the changing speed in output of a power generator. AFC capacity is a margin of control in which a power generator can further increase its output power with ease. As shown in FIG. 10, the AFC capacity varies according to the output of a power generator. When the output of a power generator is low, the AFC capacity is fixed on x1, which is obtained by multiplying Ymax and Tafc. However, when the output of a power generator becomes larger in some extent, the AFC capacity decreases with increase of the output, according to a linear function with a slope of −1. The output where lines of both cases cross each other is P1.

In this manner, the AFC capacity constraint is formulated. Outputs of separate power generators are determined with assuring the AFC capacity beforehand. Consequently, even when the predicted total demand is shifted from the actual total demand, variations in the power system frequency can be suppressed without significantly infringing the supply and demand balancing constraint.

The optimization problems described with the objective function and the various constraint equations explained above are solved by applying conventional optimization methods, and the output 7 of separate power generators can be determined at a regular interval. As for performing operations, independent variables include continuous variables such as outputs of power generators, and discrete variables such as the status of pumped-storage power plants (to pump up water for storage in a dam is called parallel in and to stop pumping up is called parallel off) and band positions in output. Quadratic Programming (QP) can be applied for the optimization of continuous values.

Figure 11:
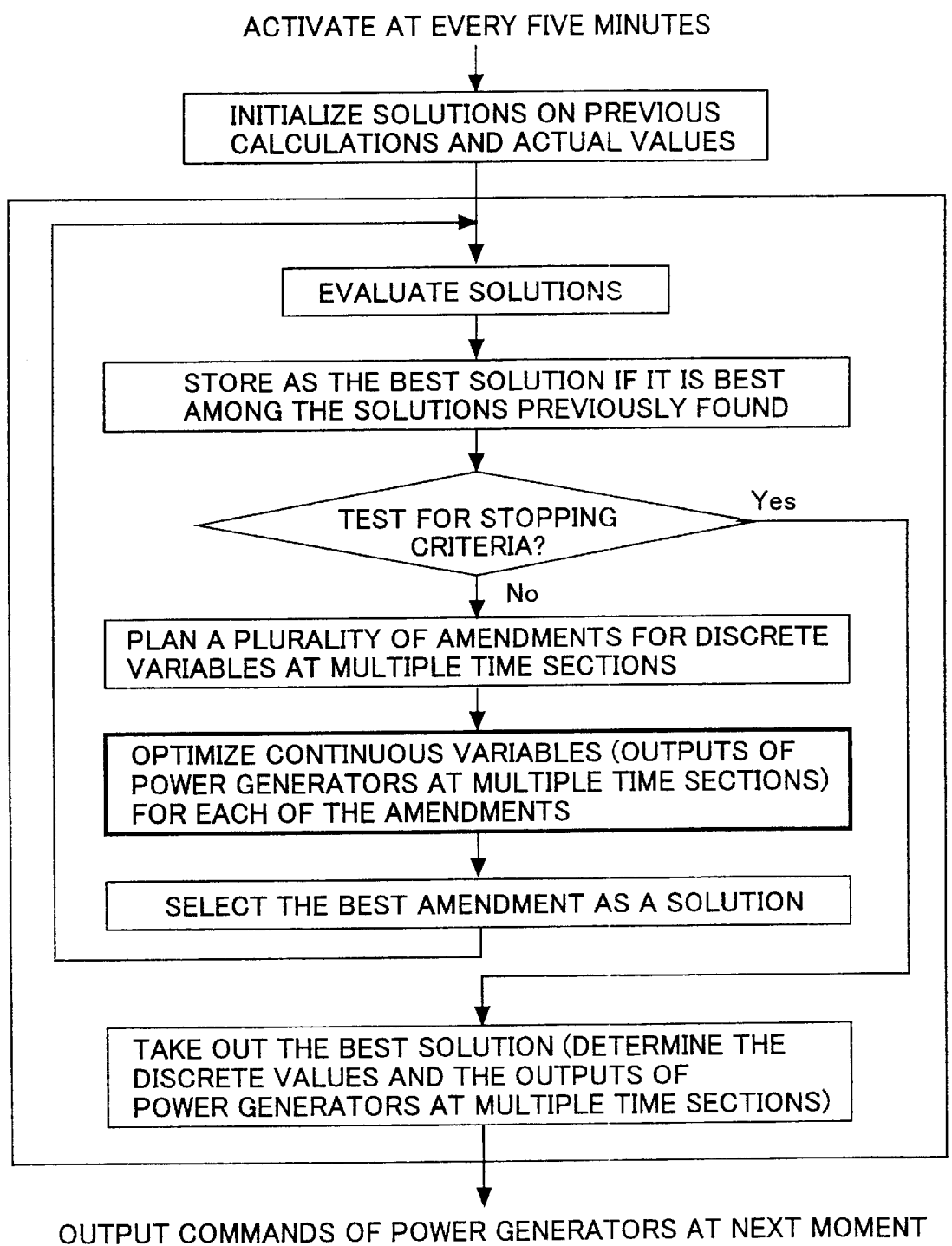
FIG. 11 is a flowchart illustrating procedures of analyzing outputs of power generators.

A method described in Japanese Patent Application Hei10-221634, entitled "DEVICE AND METHOD FOR DISTRIBUTING ECONOMIC LOAD OF THERMAL POWER GENERATOR", can be applied to the optimization of discrete variables. In addition, the problem space search model, the tab search model, the genetic algorithm or the like may be applied. FIG. 11 shows an exemplary flowchart, where the problem space search model and interior point quadratic programming are combined. In the figure, the step in a thick-lined box applies the interior point quadratic programming.

The power system section drawing unit 2 draws up the status of the future power system from the current system status and accident information of the facilities inputted by the power system monitor 40, and from scheduling data on line works inputted by the line work scheduler 30. The scheduling data on line works include ON/OFF states of switching devices and time information on the ON/OFF execution, where those devices are in need to be closed or opened according to the schedule.

Figure 12:
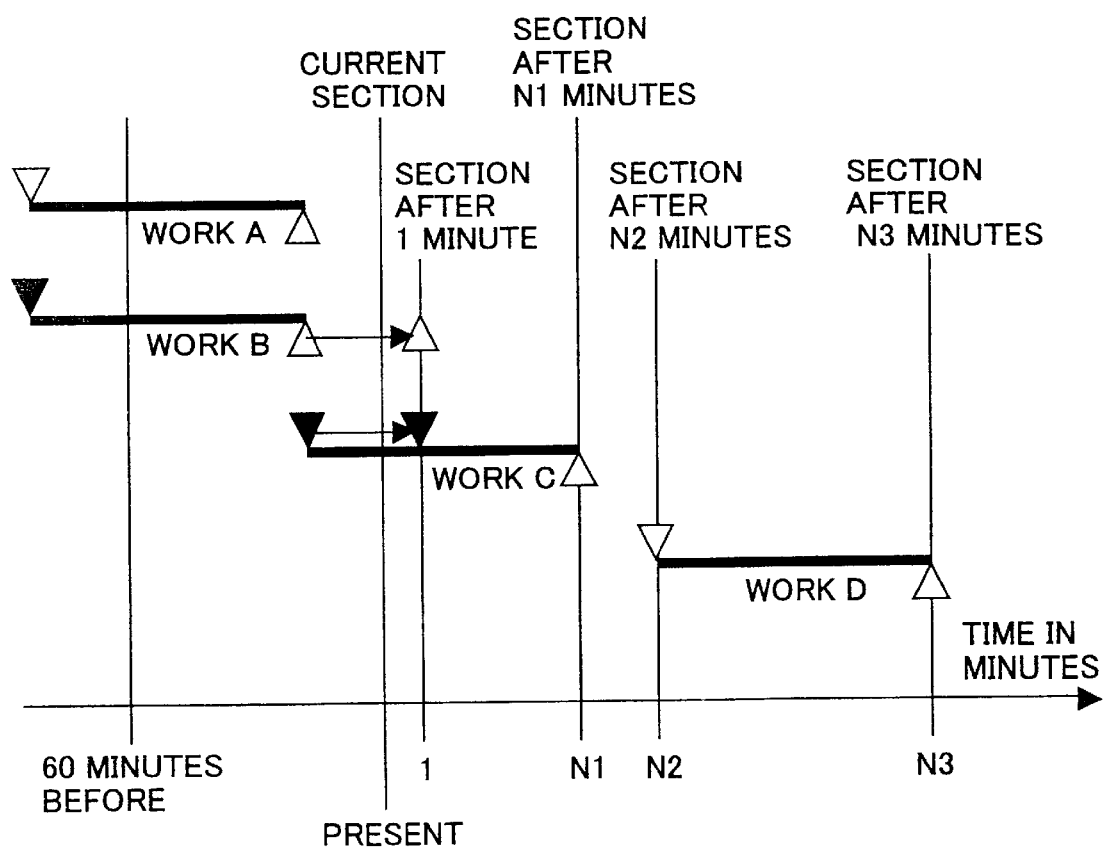
FIG. 12 is a diagram illustrating procedures of a line work scheduler.

FIG. 12 illustrates how the power system section drawing unit 2 works in principle. The power system section drawing unit 2 judges whether closedown of a line work is carried into execution or not, from comparison of the current system status and information on working facilities. Consequently, if the closedown is not on execution even after 60 minutes or more have passed from the scheduled time of the execution, for example, the power system section drawing unit 2 decides that the closedown of the line work is cancelled and eliminates it from the subsequent future system sections (like Work A in the figure). For line works which have not been decided to be cancelled, changes in the ON/OFF states of switching devices are sorted in time sequence. A plurality of future system sections are then obtained by overlapping the current system status in the order of time.

A closedown work which is not finished by the scheduled closing time, like Work B in the figure, is supposed to end one minute later. In addition, a line work that is scheduled to start before one hour or less from the present time but not yet on execution, like Work C, is supposed to be on execution one minute later in order to reflect a delay of the start. Work D is a line work which is scheduled to start after n2 minutes from the present moment and end at n3 in minute.

Figure 13:
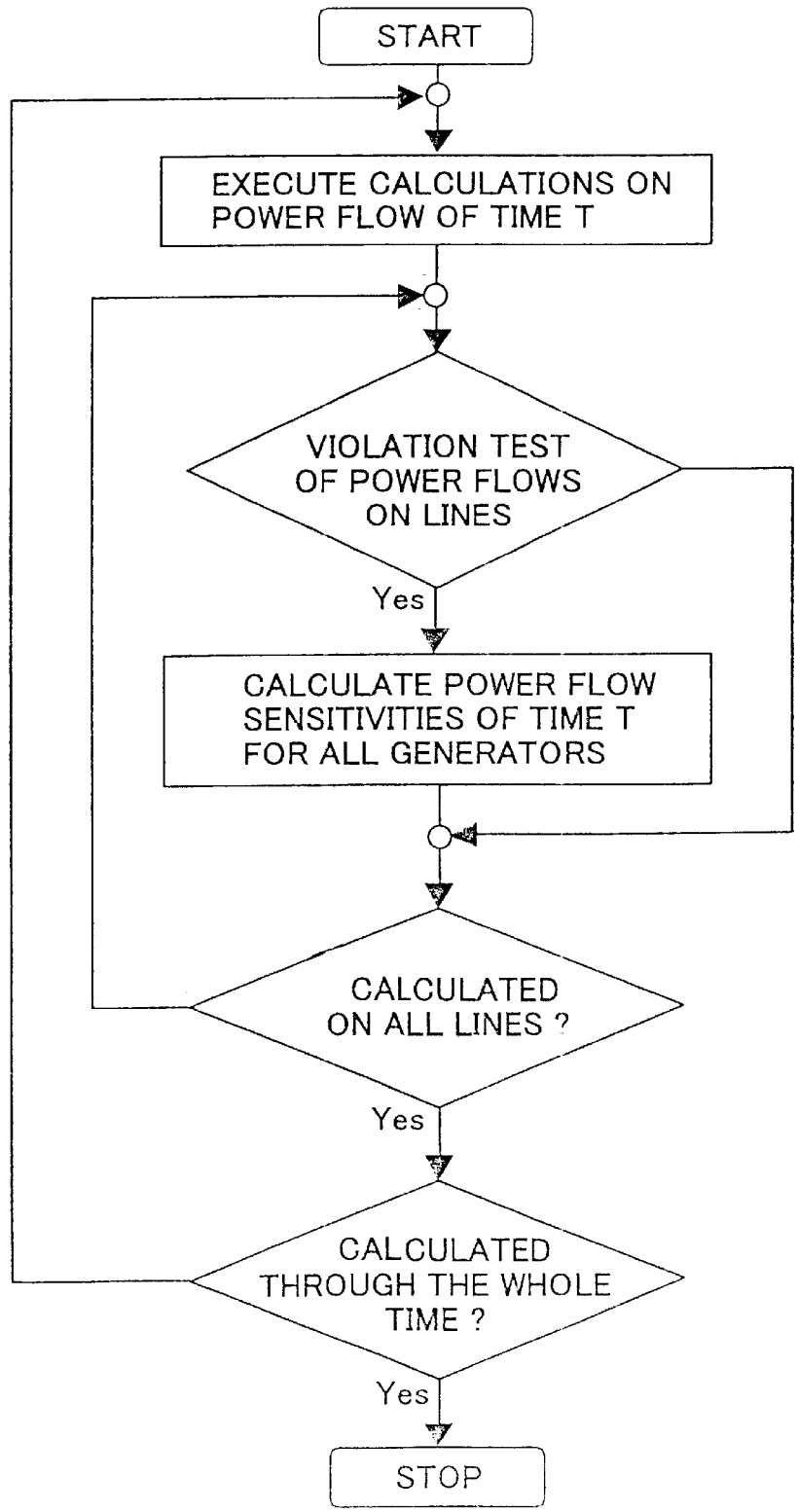
FIG. 13 is a flowchart illustrating procedures of calculating a power flow sensitivity.

The flow sensitivity calculating section 3 calculates a power flow sensitivity of each line at every future system section, by using the future system status obtained by the power system section drawing unit 2 and the outputs of power generators obtained by the output determining unit 1. FIG. 13 shows a flowchart for calculating the power flow sensitivity. The power flow sensitivity of power generator G to line L is determined by using the DC power flow calculation, for instance.

As described above, the power flow sensitivity is determined at every future system section. The power flow sensitivity thus determined reflects correctly the power system status of the day and the working state of the schedule on the line works. Therefore, the actual system status is allowed to be reflected on the power flow constraint, and power generators can adjust their outputs more accurately.

Embodiment 2

Some large customers of electricity, such as iron foundries, provide information about an increase/decrease of demand on electric power (load) beforehand. In the embodiment 2, this information and variable speed flywheels are utilized to control the outputs of power generators further accurately.

Figure 14:
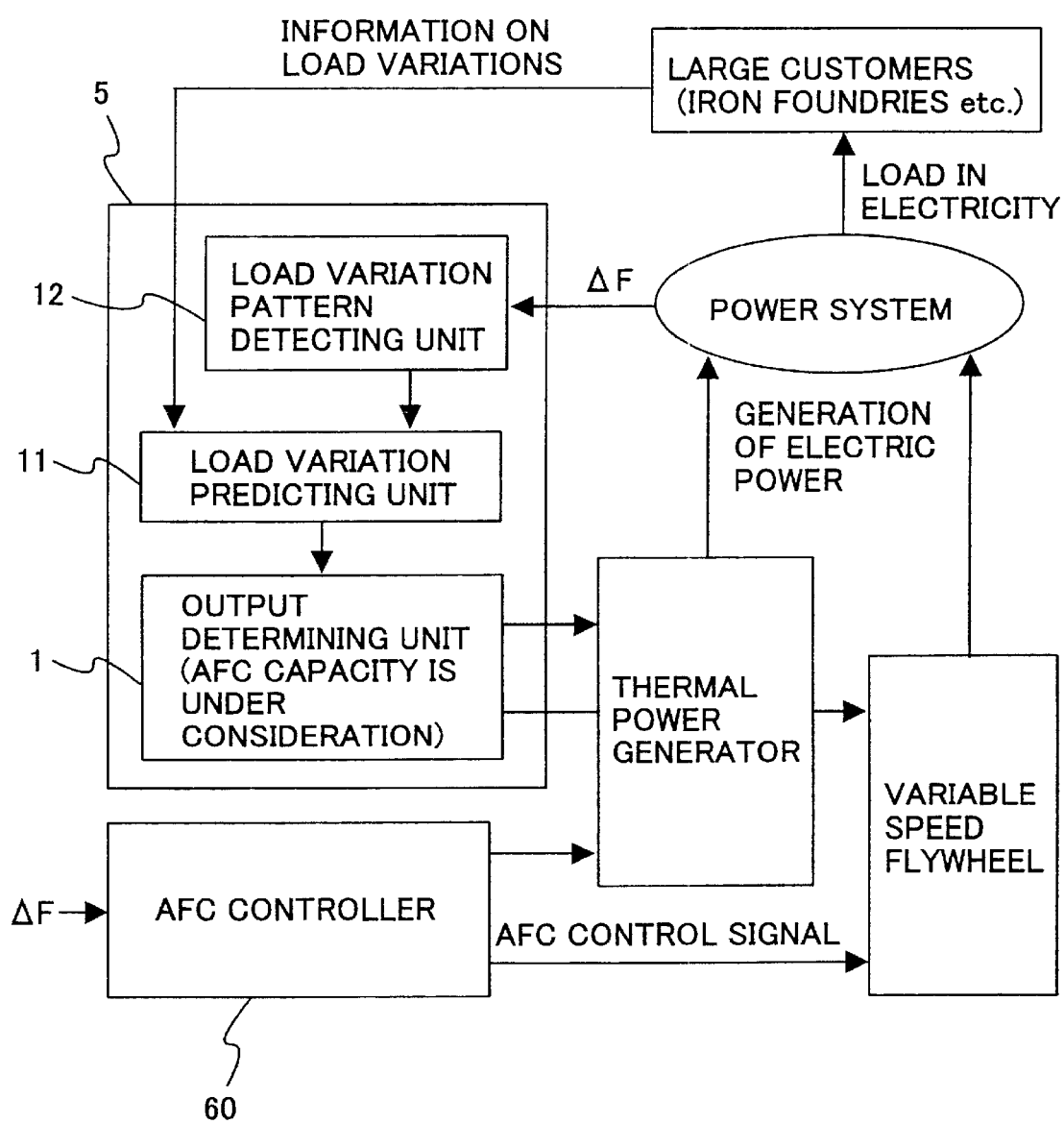
FIG. 14 is a block diagram illustrating cooperative control.

As shown in FIG. 14, a power generator output optimizing part 5 of the embodiment 2 involves a load variation predicting unit 11, which acknowledges an increase/decrease in the electricity demand beforehand through the information on load operation provided by large customers. It is acceptable that a load variation pattern detecting unit 12 analyzes patterns of the frequency deviation $\Delta F$ outputted by the power system monitor 40 and predicts the variation in electricity demand.

A variable speed flywheel, a device for storing electricity as rotational kinetic energy, is small in control capacity but can release and absorb electricity at a larger speed than a thermal power generator. The use of the variable speed flywheels for the purpose of frequency control is described, for example, in "Extended Application of a Variable Speed System to the Electric Power Field", Toshiba Review Vol. 51, No. 12 (1996).

The power generator output optimizing part 5 takes into account a variable speed flywheel capacity constraint shown in FIG. 15, for solving the objective function (see FIG. 3) The variable speed flywheel capacity constraint is formulated in use of a predicted AFC capacity (predicted control variable) rt that is determined by predicting an increase/decrease in load. In addition, a set value (Fst) may be included as a controllable variable. Hereafter, EDC control which takes into account the variable speed flywheel capacity constraint is called cooperative control. When the load variation predicting unit 11 forecasts an increase in electricity demand, the output determining unit 1, considering the coordination with AFC control, sets a AFC capacity larger than usual for a thermal power generator.

The effects where the variable speed flywheel capacity constraint is taken into account are discussed below with reference to FIGS. 16A–16E. Dotted lines show results where the cooperative control is not performed, and solid lines show results where the cooperative control is performed. FIG. 16A shows-that load (demand on electricity) in a steel works is increased by $\Delta Ps$ at time t1. As show in FIG. 16B, the power system frequencies (Fs) decrease in both cases simultaneously, but the cooperative control causes smaller frequency deviation $\Delta F$.

FIG. 16C shows variations in the rotational speed of a variable speed flywheel. When an increase of the load is predicted under the cooperative control, the rotational speed of the variable speed flywheel is set at 690 revolutions per minute before the load variations occur. This speed is an upper limit, and thus the maximum AFC capacity is secured for the variable speed flywheel. When the power system is out of the cooperative control, the speed of the variable speed flywheel is set at 600 r.p.m. (median of the speed). In this case, the AFC capacity of the variable speed flywheel is secured only at half the maximum.

Since the power system monitor 40 acknowledges variations in the power system frequency and instructs the variable speed flywheel to supply electric power in the power system at time t1, the speed of the variable speed flywheel drops to 510 r.p.m. (a lower limit of the speed). After that, whether the power system is under the cooperative control or not, the variable speed flywheel returns its speed to the normal set point. In this manner, because the power system under the cooperative control varies the set value (Fst) for the AFC capacity beforehand, the maximum value in AFC control capacity can be secured for the variable speed flywheel.

FIG. 16D shows variations in output of a thermal power generator. Whether the power system is under or out of the cooperative control, the output of the thermal power plant starts to increase at time t1 based on instructions from the central load-dispatching office. The speed of increase is relatively smaller than that of the variable speed flywheel. FIG. 16E shows the AFC capacity of the thermal power plant. Since the variable speed flywheel secures the maximum AFC capacity in one direction, the thermal power generator secures a large AFC capacity in the same direction to compensate it.

In short, because significant variations in the demand of electricity are predicted, a thermal power generator holds a large AFC capacity. The variable speed flywheel with a faster changing speed acts on momentary variations first and, after that, the thermal power generator with a speed slower than the variable speed flywheel acts on for controlling the variation.

There is a case in which variable speed flywheels are operated only by local information, where the central load-dispatching office cannot control the set values directly. In this case, variable speed flywheels are controlled indirectly in the way described below.

When a rotational speed greater than usual, for example, is desired for a variable speed flywheel beforehand to provide against a sudden rise in demand of electricity, a larger speed of the variable speed flywheel is obtained by setting the set value (reference frequency) lower than that of usual operation, if the power system is under direct control. In case of indirect control, the central load-dispatching office instructs directly controllable thermal power generators to increase their outputs and, then, the power system frequency increases. Because the variable speed flywheel can detect the increase in system frequency locally, it increases the rotational speed, thus causing the same effect.

Embodiment 3

Frequency control accompanies follow delays. In the embodiments 1 and 2, EDC control does not directly handle the frequency deviation $\Delta F$. Thus, even though the AFC control is executed at a five-second cycle in order to keep the frequency constant, the frequency of lines sometimes shifts from the rating (50 Hz or 60 Hz) to a certain extent. This shift tends to be caused, particularly when the central load-dispatching office sends separate power plants a control signal for paralleling in/off a pumped storage power plant and the signals for controlling the outputs of a plurality of power generators including thermal power generators.

In the embodiment 3, outcomes which EDC control produces at every five minutes are used as initial values Those values are further optimized to obtain a minimum frequency deviation, where follow delays and changing speeds of separate power generators are taken into consideration. Here, the frequency deviation constraint shown in FIG. 17 is under the conditional constraints. The frequency deviation $\Delta F [tj]$ is calculated from $Pi [tj]$, which is determined in consideration of follow delays and changing speeds in output of power generators. In addition, an objective function to be optimized is the one shown in FIG. 3, as in the cases of embodiments 1 and 2.

Independent variables of embodiment 3 are outputs of separate power generators and discrimination signals between parallel in and parallel off, as those of the EDC operation at every five minutes. The frequency deviation ΔF [tj], which has not been considered before, is taken into account as the frequency deviation constraint to determine outputs of power generators. Follow delays and changing speeds of the power generators are considered in those outputs. Thus, frequency variations which are caused by the adjustment of outputs or the parallel in/off of power generators, particularly of pumped-storage power plants, are reduced.

Embodiment 4

Figure 18:
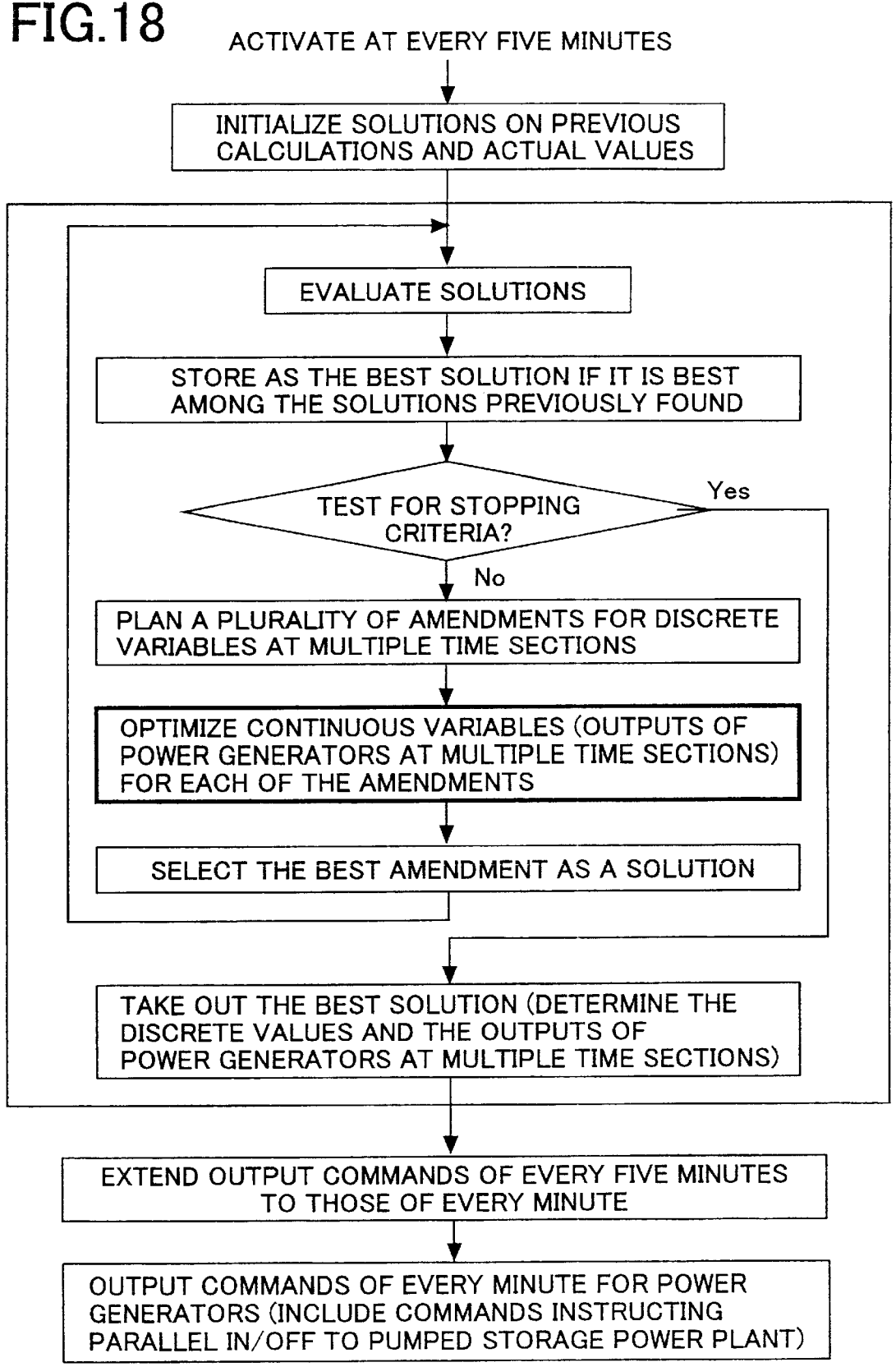
FIG. 18 is a flowchart illustrating procedures of calculating output commands at two steps.

Calculating output commands every minute, instead of every five minutes, based on the frequency deviation constraint shown in the embodiment 3, would increase time pitches and the amount of operations. The increase does not allow the actual operational speed to follow. Then, in the embodiment 4, calculation is first performed every five minutes without incorporating the frequency deviation constraint shown in FIG. 18 (see FIG. 11). Based on the first calculation, second calculation is performed every minute for further accuracy with incorporating the constraint conditions on frequency deviation ΔF (see FIG. 17), where output commands for power generators, times of the commands, and control times for parallel in/off signals are determined. That is, a two-step calculation is performed.

The output commands for separate power generators of every minute can be calculated easily with past actual demands etc., by applying a certain follow delay pattern or a simple model such as the one using a linear equation to the equation for determining the frequency deviation ΔF [tj], because follow delays and changing speeds in the output of power generators are known beforehand for Pi [tj] in the constraint.

Figure 19:
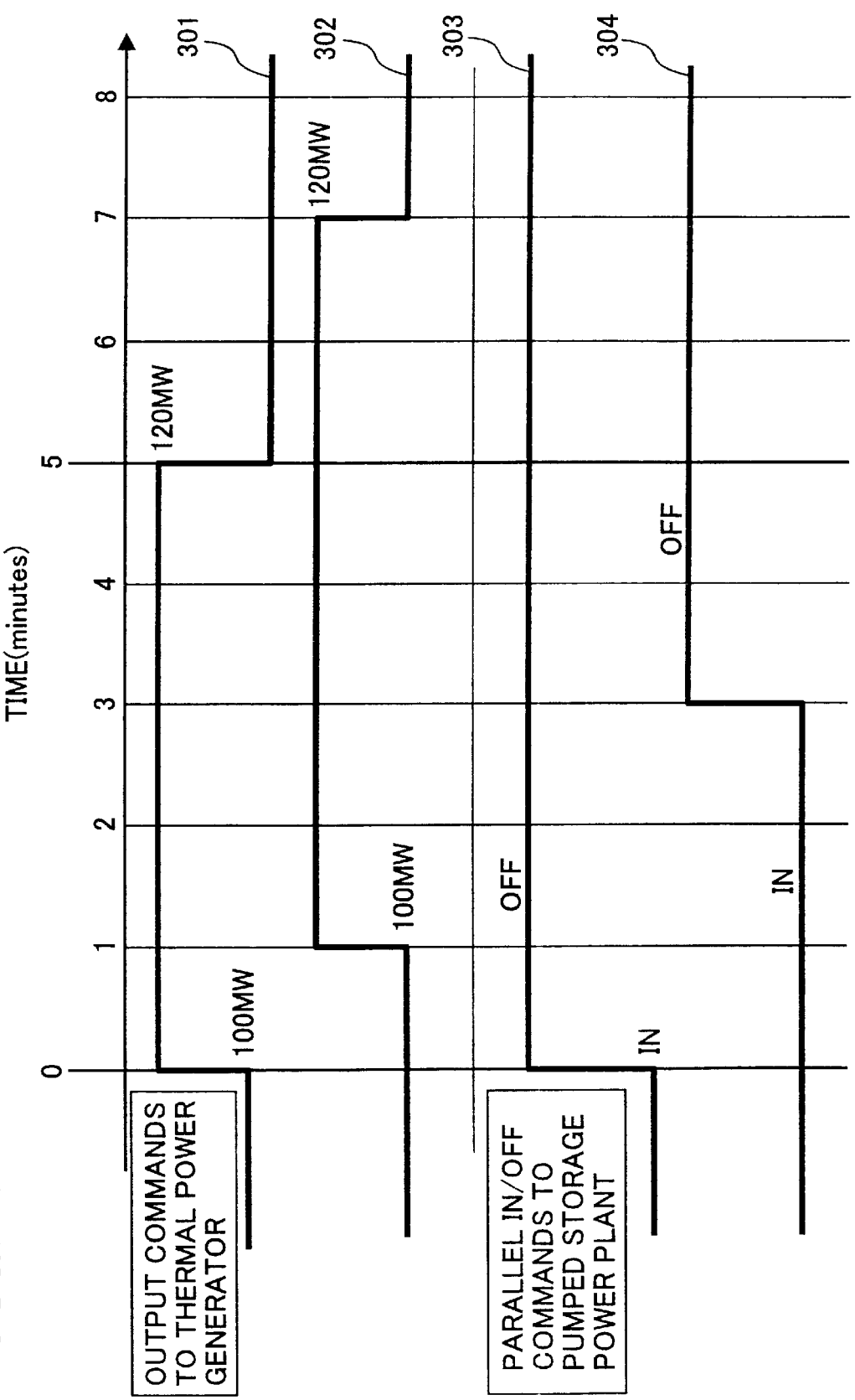
FIG. 19 is a diagram illustrating effects of calculated output commands at two steps.

The effects of the embodiment 4 will be described with reference to FIG. 19, where the calculated outcomes of EDC operation performed every five minutes are extended to the outcomes performed every minute. Commands 301 and 302 are for a thermal power generator to control the output. The command 301 is calculated outcomes of every five minutes, which means instructions for the generator to increase the output from 100 MW to 120 MW at time Zero in minute and then to reduce the output to 100 MW at time Five in minute.

However, the output of the generator is not immediately raised to 120 MW stepwise even though the output command instructs the generator to change its output from 100 MW to 120 MW at time Zero in minute, because power generation plants have various follow delays. Indeed, the output increases somewhat gradually from 100 MW to 120 MW with a certain gradient which starts at the time Zero in minute. The manner of increase in output is predicted from the past actual demands and the sum of the increase is figured out, whereby the values of Pi [tj] are determined at times Zero, One, Two, Three, Four and Five in minute.

Commands 303 and 304 are discriminating signals between parallel in and parallel off for pumped-storage power plants of 500,000 KW class, for example. The command 303 instructs that the pumped-storage power plants are taken off from the power system at time Zero in minute. When the instruction is executed correctly, the load of 500,000 kW is suddenly diminished to zero in kW. Thus, supply and demand on electricity loses balance greatly, and consequently the power system frequency increases by about 0.1 Hz from the rated value.

Owing to these facts, the follow delays and changing speeds in output of power generators are taken into account. In a case where outcomes of every five minutes in output of power generators are extended to those of every minute, the command 302 is issued that the thermal power generator increase the output at time One in minute and decrease the output at time Seven in minute. In addition, the command 304 is given to the pumped-storage power plant to place the parallel off from the power system at time Three in minute, not at time zero in minute.

As described above, based on the outcomes which are produced by determining outputs of power generators every several minutes or so with a certain accuracy, fine calculations are performed for further accuracy at an interval of one minute or so, whereby timing for performing a large-sized control in capacity such as the start-up or shutdown of a pumped-storage power plant can be determined without great increase in calculation time.

What is claimed is:

1. A power generator controller comprising:
a power system monitor monitoring current status of each of a plurality of power generators of a power system and demand for electricity from the power system; and
a power-generator-output-optimizing-part solving an objective function in consideration of a balancing constraint balancing supply of power from the generators and demand for electricity from the power system and determining an output of each of the power generators of the power system at each of a plurality of intervals, the objective function requiring minimized total cost of power generation subject to the balancing constraint, wherein the power-generator-output-optimizing-part solves the objective function in further consideration of automatic frequency control (AFC) capacity, based on an upper limit of rate of change of the power output of each of the power generators.

2. The power generator controller according to claim 1, wherein the power-generator-output-optimizing-part solves the objective function incorporating a fuel consumption constraint which requires that total power outputs of the power generators of the power system are in agreement with a target fuel consumption.

3. The power generator controller according to claim 1, including a load-variation-predicting-unit predicting load variations of the power generators of the power system and calculating a predicted control variable, wherein the power-generator-output-optimizing-part solves the objective function incorporating a variable speed flywheel capacity constraint determined in consideration of the predicted control variable.

4. The power generator controller according to claim 1, wherein the power-generator-output-optimizing-part solves the objective function incorporating a frequency deviation constraint that takes into account follow delay of each of the power generators of the power system.

5. The power generator controller according to claim 4, wherein, in solving the objective function incorporating the frequency deviation constraint, the power-generator-output-optimizing-part calculates the power outputs of each of the power generators of the power system at a first of the intervals, without taking account of the frequency deviation constraint, and solves the objective function at a second of the intervals, which is shorter than the first interval, of the outputs of each of the power generators of the power system, taking the frequency deviation constraint into account.

6. The power generator controller according to claim 1, including a control signal transmitter transmitting to separate power plants of the power system the power outputs of each of the power generators of the power system determined by the power-generator-output-optimizing-part.

7. The power generator controller according to claim 1, wherein cost of power generation at each of the power generators of the power system is described as a quadratic function of power outputs of the respective power generators.

8. A power generator controller comprising:
- a power system monitor monitoring operative and inoperative states of each of lines connected to a power system including a plurality of power generators and outputting current status of the power system;
- a line work scheduler outputting a schedule for work on the lines, the schedule describing a switching schedule of the lines;
- a power-system-section-drawing-unit planning future status of the power system, using the current status of the power system and the schedule for work on the lines;
- a power-flow-sensitivity-calculating-unit calculating power flow sensitivity of each of the lines for each power generator in each section of the power system, planned by the power-system-section-drawing-unit; and
- a power-generator-output-optimizing-part solving an objective function incorporating a power flow constraint and determining the power outputs of each of the power generators of the power system at each of a plurality of intervals, the objective function requiring minimized total cost of power generation by the plurality of power generators of the power system, subject to the power flow constraint of each of the lines, described as the power flow sensitivity of each of the lines for each of the power generators, wherein the power-generator-output-optimizing-part uses the power flow sensitivity calculated by the power-flow-sensitivity-calculating-unit, considering the power flow constraint.

9. The power generator controller according to claim 8, wherein the power-generator-output-optimizing-part solves the objective function incorporating a fuel consumption constraint which requires that total power outputs of the power generators of the power system are in agreement with a target fuel consumption.

10. The power generator controller according to claim 8, wherein the power-generator-output-optimizing-part solves the objective function incorporating an automatic frequency control capacity constraint determined based on an upper limit on rate of change in the power output of each of the power generators of the power system.

11. The power generator controller according to claim 8, including a load-variation-predicting-unit predicting load variations of the power generators of the power system and calculating a predicted control variable, wherein the power-generator-output-optimizing-part solves the objective function incorporating a variable speed flywheel capacity constraint determined in consideration of the predicted control variable.

12. The power generator controller according to claim 8, wherein the power-generator-output-optimizing-part solves the objective function incorporating a frequency deviation constraint that takes into account follow delay of each of the power generators of the power system.

13. The power generator controller according to claim 12, wherein, in solving the objective function incorporating the frequency deviation constraint, the power-generator-output-optimizing-part calculates the power outputs of each of the power generators of the power system at a first of the intervals, without taking account of the frequency deviation constraint, and solves the objective function at a second of the intervals, which is shorter than the first interval, of the outputs of each of the power generators of the power system, taking the frequency deviation constraint into account.

14. The power generator controller according to claim 8, including a control signal transmitter transmitting to separate power plants of the power system the power outputs of each of the power generators of the power system determined by the power-generator-output-optimizing-part.

15. The power generator controller according to claim 8, wherein cost of power generation at each of the power generators of the power system is described as a quadratic function of power outputs of the respective power generators.

* * * * *